(12) United States Patent
Mayeu et al.

(10) Patent No.: US 9,499,426 B2
(45) Date of Patent: Nov. 22, 2016

(54) DEVICE FOR MANUFACTURING A HOLLOW GLASS ARTICLE COMPRISING A MOLD INTENDED TO RECEIVE A PARISON

(71) Applicant: POCHET DU COURVAL, Paris (FR)

(72) Inventors: Patrice Mayeu, Blangy-sur-Bresle (FR); Sebastien Guerout, Monchaux Soreng (FR)

(73) Assignee: POCHET DU COURVAL, Paris (FR)

( * ) Notice: Subject to any disclaimer, the term of this patent is extended or adjusted under 35 U.S.C. 154(b) by 0 days.

(21) Appl. No.: 14/500,173

(22) Filed: Sep. 29, 2014

(65) Prior Publication Data

US 2015/0090685 A1   Apr. 2, 2015

(30) Foreign Application Priority Data

Oct. 1, 2013 (FR) ..................... 13 59510

(51) Int. Cl.
| | |
|---|---|
| *C03B 9/325* | (2006.01) |
| *B65D 1/02* | (2006.01) |
| *C03B 9/347* | (2006.01) |
| *C03B 9/447* | (2006.01) |
| *C03B 9/32* | (2006.01) |
| *C03B 9/34* | (2006.01) |
| *C03B 9/36* | (2006.01) |

(52) U.S. Cl.
CPC ............... *C03B 9/325* (2013.01); *B65D 1/023* (2013.01); *B65D 1/0223* (2013.01); *C03B 9/32* (2013.01); *C03B 9/342* (2013.01); *C03B 9/347* (2013.01); *C03B 9/36* (2013.01); *C03B 9/3663* (2013.01); *C03B 9/447* (2013.01)

(58) Field of Classification Search
CPC .......... C03B 9/325; C03B 9/347; B65D 1/02
USPC ..................... 65/261, 110; 215/40
See application file for complete search history.

(56) References Cited

U.S. PATENT DOCUMENTS

| | | |
|---|---|---|
| 2004/0079769 A1 | 4/2004 | Balzeau |
| 2013/0047675 A1 | 2/2013 | Benoit et al. |

FOREIGN PATENT DOCUMENTS

| | | |
|---|---|---|
| DE | 39 08 122 | 10/1989 |
| FR | 2 772 020 | 6/1999 |
| FR | 2 978 440 | 2/2013 |
| WO | WO 99/42411 | 8/1999 |

OTHER PUBLICATIONS

FR 2 772 020, Process and Device for Producing Glass Objects Having a Hollow Part, Varlet Hubert, Jun. 1999, translation.*

* cited by examiner

*Primary Examiner* — Mark Halpern
(74) *Attorney, Agent, or Firm* — Davidson, Davidson & Kappel, LLC

(57) ABSTRACT

A device for forming a hollow glass article from a parison is provided. The hollow glass article includes a ring extending around an axis, a body and at least one shoulder extending between the ring and body. The device includes a mold including a plurality of portions movable between a closed configuration and an open configuration. The closed configuration defines a first imprint for forming the body of the article. The device also includes a blowing head movable between a blowing position and a rest position. In the blowing position, the blowing head injects at least one gas jet into an inside of the parison. The blowing head includes at least one face defining a second imprint for forming at least one portion of the at least one shoulder in the blowing position. A method and hollow glass article are also provided.

1 Claim, 4 Drawing Sheets

DEVICE FOR MANUFACTURING A HOLLOW GLASS ARTICLE COMPRISING A MOLD INTENDED TO RECEIVE A PARISON

This claims the benefit of French Patent Application FR 13 59510, filed Oct. 1, 2013 and hereby incorporated by reference herein.

The present invention relates to a device for forming a hollow glass article from a parison, the article including a ring extending around an axis, a body, and one or several shoulders extending between the ring and the body, the device comprising a mold intended to receive the parison, the mold including several movable portions between a closed configuration in which are the portions define a first imprint adapted for forming of the body of the article, and an open configuration in which the portions are moved away from each other in order to remove the article from the mold, and a movable blowing head between a blowing position in which the blowing head is applied against the mold, and a rest position in which the blowing head is at a distance from the mold, the blowing head being adapted so as to reject at least one gas jet into the inside of the parison in the blowing position.

The invention also relates to a corresponding method and to the obtained hollow glass article.

The article is for example a flask or a pot, for example a flask intended for the perfume industry.

BACKGROUND

A known way for manufacturing a hollow glass article is the blow & blow method. A molten glass parison is introduced into a blank mold. A pressurized gas jet for example air, is injected into the blank mold in order to transform the parison into a blank of the article.

The thereby made blank is transferred into a finishing mold. The finishing mold defines an aperture for letting through the ring. A second injection of pressurized gas is achieved in the blank through the ring by a blowing head placed on the aperture of the finishing mold. The blank then assumes the shape of the imprint as defined by the finishing mold, which gives to the body and to the shoulders of the hollow glass article their external shapes.

A conventional finishing mold comprises at least the two half-molds adapted so as to move away from each other after the blowing so as to allow the removal of the hollow glass article from the mold. Although giving the possibility of obtaining articles having a large variety of shapes, such a mold nevertheless limits the possibilities for the shape of the articles, in particular at the shoulders.

An object of the invention is therefore to provide a device for forming a hollow glass article from a parison, the device giving the possibility of obtaining a larger variety of shoulder shapes.

SUMMARY OF THE INVENTION

It is an object of the present invention to provide a device for forming a hollow glass article from a parison of the type described above, in which the blowing head includes at least one face defining a second imprint adapted for forming at least the one portion of the shoulder(s) in the blowing position.

According to particular embodiments, the printing machine comprises one or several of the following features, taken individually or according to all the technically possible combinations:

the device comprises a system for moving portions of a mold between the closed configuration and the open configuration, the face of the blowing head being configured in the blowing position so that the portion of the shoulder(s) formed by the face includes at least one portion located in an angular sector with respect to the axis, said portion being undercut relatively to the displacement of one of the portions of the mold located at least partially in said angular sector, the face includes raised or recessed forms adapted for forming patterns on the shoulder(s) of the article, the raised or recessed forms of the face are configured so that the patterns formed on the shoulder(s) of the article include at least one pattern located in an angular sector relatively to the axis, said pattern being undercut relatively to the displacement of one of the portions of the mold located in the angular sector, the face has a substantially planar general shape, the general shape defining in the blowing position an acute angle with the axis, the acute angle opening on the side opposite to the body of the article along the axis, the blowing head comprises at least one second face defining a third imprint disconnected from the second imprint and suitable for forming at least one second portion of the shoulder(s) in the blowing position, the first face and the second face being preferably located on either side of the axis in the blowing position, the device comprises an arm on which is attached the blowing head, the arm being adapted so as to displace the blowing head in a single block substantially along the axis between the blowing position and the rest position, and the device comprises at least one first guiding member secured to the blowing head, and at least one second guiding member secured to the mold and adapted for cooperating with the first guiding member in order to set the angular position of the face in the blowing position relatively to the mold around the axis.

The invention also relates to a method for manufacturing a hollow glass article from a parison, the article including a ring extending around an axis, a body, and one or several shoulders extending between the ring and the body, the method comprising at least the following steps: receiving a parison of the article in a mold including several movable portions between a closed configuration in which the portions define a first imprint suitable for forming the body of the article, and an open configuration in which the portions are moved away from each other in order to remove the article from the mold; and injecting at least one gas jet inside the parison by means of a movable blowing head between a blowing position in which the blowing head is applied against the mold, and a rest position in which the blowing head is at a distance from the mold, the blowing head being in the blowing position during the injection, the blowing head including at least one face defining a second imprint suitable for forming at least one portion of the shoulder(s) in the blowing position.

Finally the invention relates to a hollow glass article obtained by a method as described above, the article including a ring extending around an axis, a body, and a one or several shoulders extending between the ring and the body, the portion of the shoulder(s) formed by the face including at least one portion located in an angular sector relatively to the axis, said portion being undercut relatively to the displacement on one of the portions of the mold located in the angular sector.

BRIEF DESCRIPTION OF THE DRAWINGS

The invention will be better understood upon reading the description which follows, only given as example and made with reference to the appended drawings, wherein.

DETAILED DESCRIPTION

Figure 1:
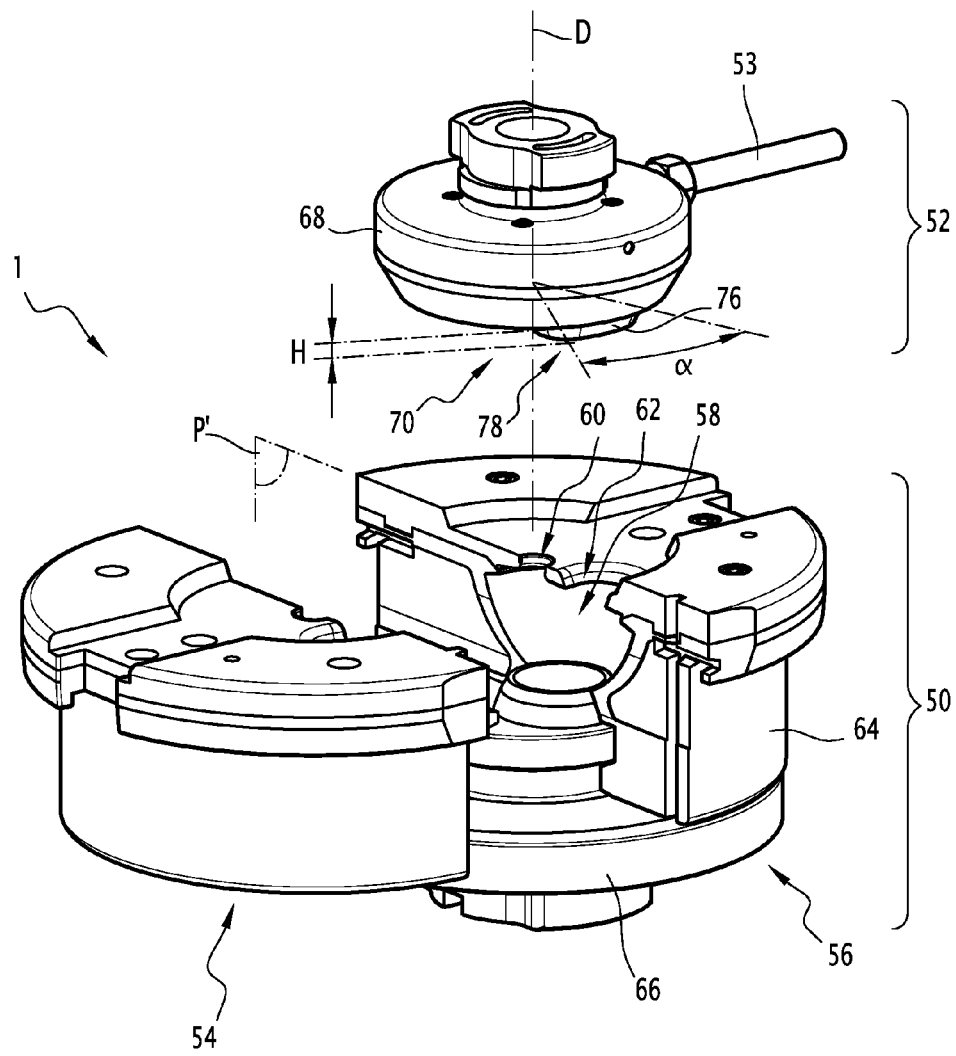
FIG. 1 is a schematic view of a device according to a first embodiment of the present invention, the mold being in the open configuration and the blowing head being in the rest position.
Figure 2:
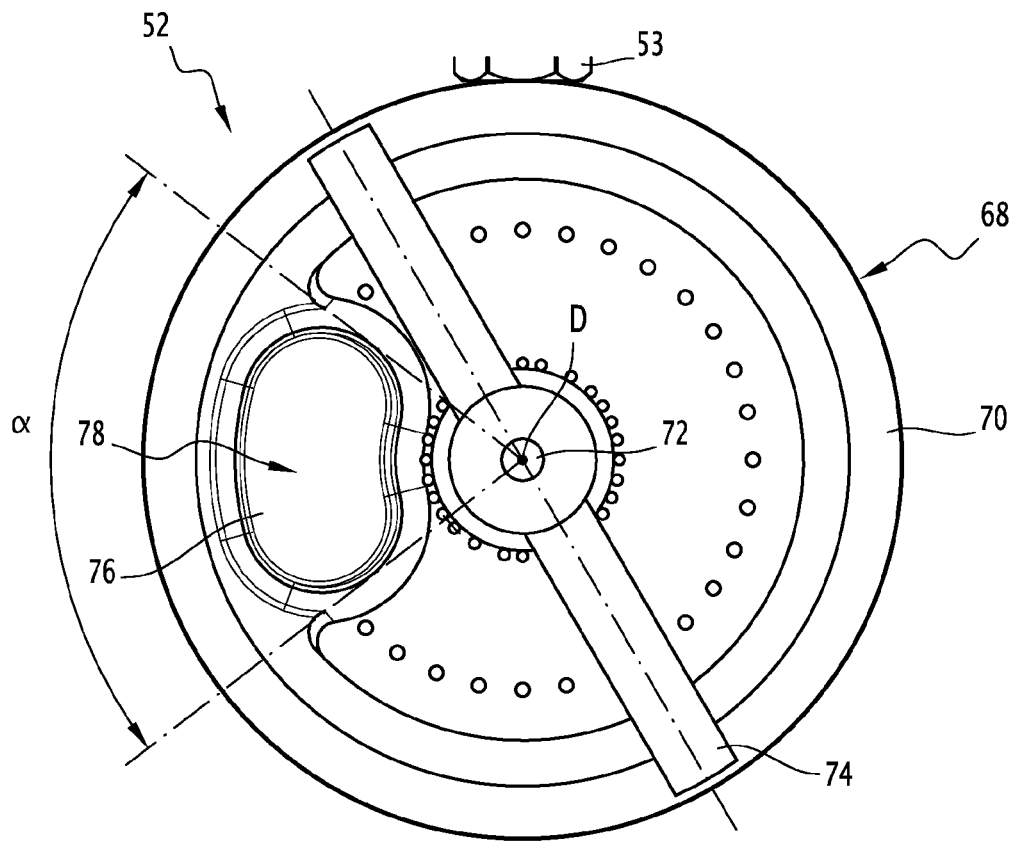
FIG. 2 is a schematic view of a lower portion of the blowing head of the device illustrated in FIG. 1.

With reference to FIGS. 1 and 2, a device 1 according to a first embodiment of the invention is described. The device 1 gives the possibility of obtaining a first hollow glass article 10 according to the invention, visible in FIG. 3.

The first article 10 comprises a body 12, a ring 14 defining an aperture 16 along an axis D, and shoulders 18 extending between the body 12 and the ring 14.

In the illustrated example, the axis D is substantially vertical when the article is laid on a horizontal support. The axis D is substantially vertical when the article 10 is in the device 1.

The body 12 includes a curved lateral surface 20 and defines a bottom 22 allowing the first article 10 to be laid on a planar support. The body 12 for example is cup-shaped.

The ring 14 has a cylindrical general shape of axis D with a circular base. The ring 14 is intended to receive a cap or an endpiece intended to receive the cap. By "ring", in the sense of the present application, is meant a neck.

The shoulders 18 extending from the ring 14 in all the directions as far as the body 12, for example substantially along a plane P perpendicular to the axis D.

The shoulders 18 extender from a closed line 26 corresponding to an area with maximum curvature located at the foot of the ring 14, as far as an edge 28 corresponding to an area where the lateral surface 20 encounters the plane P.

The line 26 and the edge 28 are for example circular.

In certain alternatives of the hollow glass article, the shoulders and the body are in the continuity of each other so that the limit between body and shoulders is arbitrary. The shoulders are in any case defined as a portion of the article located in the vicinity of the ring and in contact with it.

The shoulders 18 comprise a shoulder 30 defining a peripheral portion 32 of the shoulders 18, for example ring-shaped, and a central portion 34.

The peripheral portion 32 and the central portion 34 are substantially orthogonal to the axis D.

The central portion 34 includes a portion 35 for example forming a recessed pattern 36 located in an angular sector a relatively to the axis D.

The portion 35 for example has a surface of at least 1 cm$^2$, for example at least 2 cm$^2$ as a projection on a given plane, for example the plane P.

The pattern 36 for example has an oblong shape when projected on the plane P. The pattern 36 for example has a substantially constant depth H along the axis D.

The depth H is for example comprised between 0.5 and 5 mm.

Figure 3:
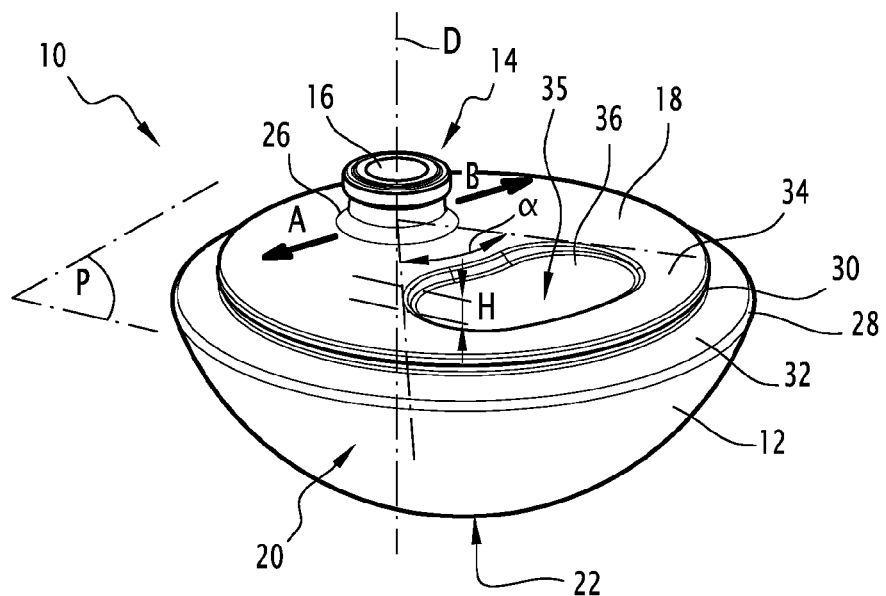
FIG. 3 is a front schematic view of a first article according to the present invention, produced by means of the device illustrated in FIGS. 1 and 2.

One will refer to shoulders, in the plural, when the shoulders 18 extending from the ring 14 on at least two sides relatively to the axis D, for example the sides illustrated by the arrows A and B in FIG. 3.

One will refer to shoulder, in the singular, when the hollow glass article only extends on one side of the ring.

As visible in FIG. 1, the device 1 comprises a finishing mold 50 intended to receive a parison of the first article 10, a blowing head 52, and an arm 53 bearing the blowing head.

In the example illustrated in FIG. 1, the finishing mold 50 comprises two portions 54, 56 forming two half-molds.

By means of a displacement system, the portions 54, 56 are movable between a closed configuration, in which the portions 54, 56 are applied against each other and define a first imprint 58 adapted so as to form the body 12 of the article 10, and an open configuration (FIG. 1), in which the portions 54, 56 of the mold are moved away from each other for removing the article 10 from the mold.

In the open configuration, the portions 54, 56 are for example moved away from each other substantially perpendicularly to the axis D.

In the closed configuration, the portions 54, 56 are applied against each other, for example along a plane P'. The closed configuration is inferred from the open configuration illustrated in FIG. 1 by a translation of the portions 54, 56 towards each other.

In the example illustrated in FIG. 1, the first imprint 58 is further adapted in order to form the shoulders 18 except for the portion 35. The first imprint 58 includes a first aperture 60 adapted so as to let through the ring 14, and a second aperture 62 intended to be located facing the portion 35.

The portion 54 of the mold 50 defines a half of the first aperture 60 located on one side of the plane P', and a half of the second aperture 62 located on the same side of the plane P'. The portion 54 defines a portion of the first imprint 58 corresponding to a half of the lateral surface 20 of the body 12 located on the same side of the plane P'.

The portion 56 comprises a portion 64 substantially symmetrical with the portion 54 relatively to the plane P', and a bottom 66.

The portion 56 defines the other half of the first aperture 60 located on the other side of the plane P', and the other half of the second aperture 62 also located on the other side of the plane P'. The portion 56 defines a portion of the first imprint 58 corresponding to the other half of the lateral surface 20 of the body 12 also located on the other side of the plane P'.

The bottom 66 of the mold 50 defines a portion of the first imprint 58 corresponding to the bottom 22 of the article 10.

The arm 53 is intended to be connected to displacement means adapted so as to have the blowing head 52 pass from a rest position, in which the blowing head is away from the mold 50 (FIG. 1), to a blowing position, in which the blowing head is applied against the mold, and the vice a versa from the blowing position to the rest position. The arm 53 is for example adapted so as to move the blowing head 52 in a single block, substantially along the axis D of the first article 10, between the blowing position and the rest position.

The blowing head 52 is intended to be connected to a gas source, for example air. The blowing head 52 comprises a substantially axisymmetrical body 68 around the axis D.

The body 68 includes a lower portion 70, able to be applied against the mold 50 in its closed configuration when the blowing head 52 is in the blowing position.

The lower portion 70 includes an orifice 72 provided for letting through an air jet intended to enter the parison of the article 10. The lower portion 70 comprises a diametrical groove 74 extending on either side of the orifice 72, and a protruding face 76 with respect to the remainder of the lower portion.

The groove 74 is adapted so as to cooperate with the mold 50 in its closed configuration in order to form two air exhaust channels.

The face 76 has a shape mating the portion 35 of the shoulders 18. The face 76 forms a second imprint 78 adapted so as to form the pattern 36 in the blowing position.

The face 76 is located in the same angular sector a relatively to the axis D as the portion 35. The portions 54, 56 of the mold 50 are partly located in the angular sector α. The pattern 36 is undercut relatively to the displacement of the portions 54, 56 from the closed configuration to the open configuration.

The operation of the device 1 will now be described.

By the displacement means, the mold 50 is put into its closed configuration in which it defines the first imprint 58, the blowing head 52 being located in the rest position. The parison of the first article 10 is then introduced into the mold 50.

Next, the blowing head 52 is lowered by the arm 53 from the rest position to the blowing position. The orifice 72 will be placed facing the first aperture 60 of the first imprint 58. The face 76, which forms the second imprint 78, will close the second aperture 62. The first imprint 58 and the second imprint 78 complement each other so as to form a complete imprint for forming the body 12 and the shoulders 18.

Air is injected into the body 68 of the blowing head 52 and opens out as a jet through the orifice 72. The air jet enters the parison and inflates it. The parison assumes the shape of the first imprint 58 and of the second imprint 78. The injected air escapes through the channels formed by the groove 74 of the blowing head 52.

The first imprint 58 gives their external shapes (visible in FIG. 3) to the shoulders 18 except for a portion 35. The second imprint 78 gives its external shape to the portion 35. The second imprint 78 generates the pattern 36.

And the blowing head is then replaced in the rest position. The first article 10 is removed from the mold by having the mold 50 parts from the closed configuration to the open configuration, and the blowing head 52 from the blowing position to the rest position. The body 12 and the shoulders 18, except for the pattern 36, are drafted relatively to the movement of the portions 54, 56 of the mold 50 during the removal from the mold.

On the other hand, the pattern 36 is undercut relatively to the movement of the portions 54, 56 during removal from the mold. The pattern 36 is drafted relatively to the movement of the face 76 during removal from the mold. Stated otherwise, it would not be possible to remove the first article 10 from the mold if the face 76 was secured to either one of the portions 54, 56 of the mold 50.

By means of the features described above, the device 1 gives the possibility of obtaining a first article 10 including the shoulders 18 having the recessed pattern 36. The first article 10 would have been impossible to remove from the mold in a finishing mold of the state of the art. The device 1 therefore gives the possibility of obtaining a larger variety of shapes for the shoulders 18 of the article 10.

Figure 4:
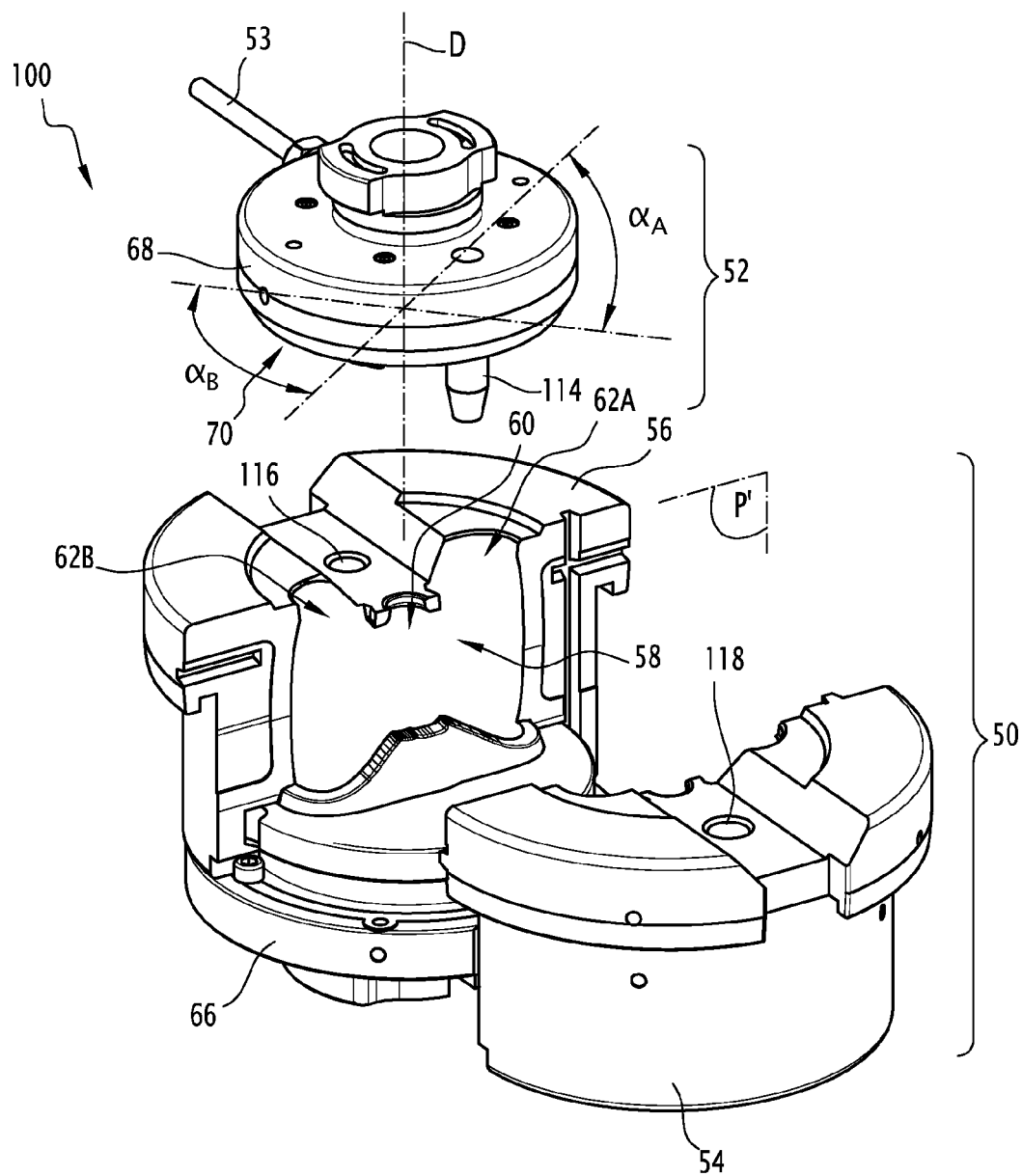
FIG. 4 is a schematic view of a device according to a second embodiment of the present invention, the mold being in the open configuration and the blowing head being in the rest position.
Figure 5:
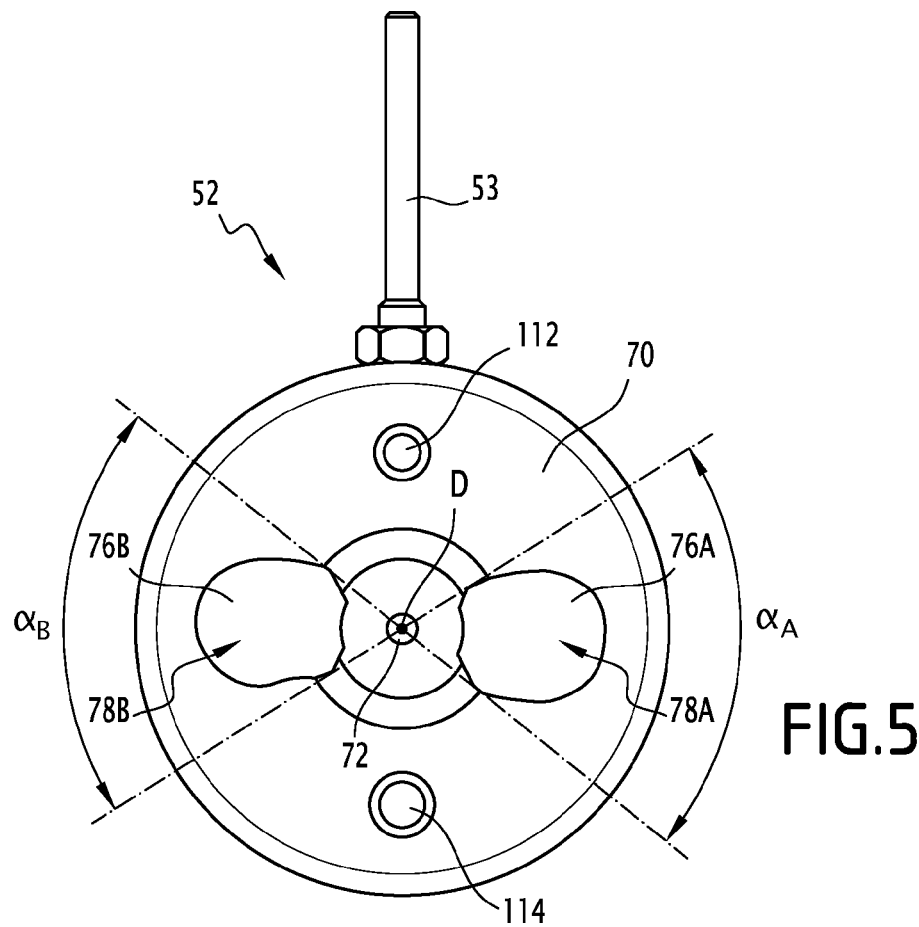
FIG. 5 is a schematic view of a lower portion of the blowing head of the device illustrated in FIG. 4.
Figure 6:
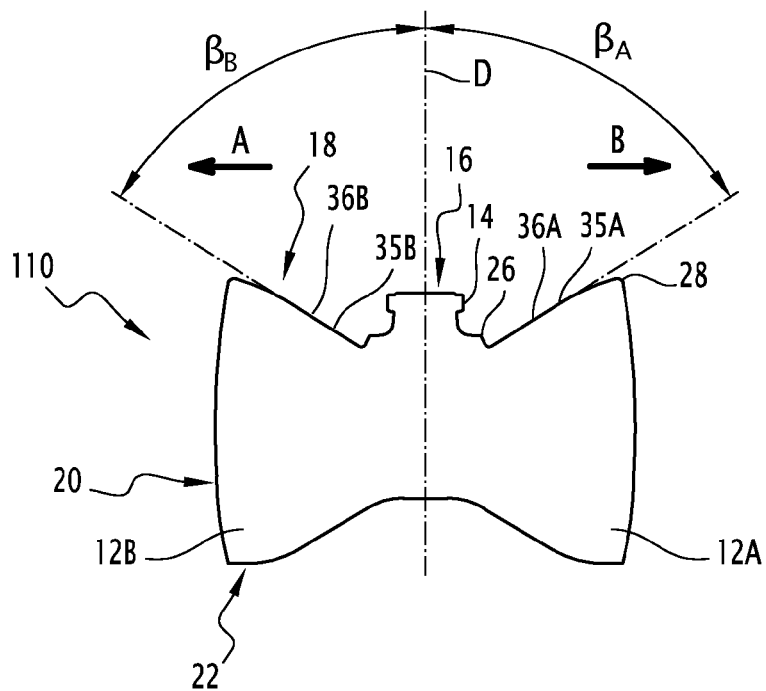
FIG. 6 is a front schematic view of a second article according to the present invention, produced by means of the device illustrated in FIGS. 4 and 5.

With reference to FIGS. 4 and 5, a device 100 forming a second embodiment of the invention will now be described. The device 100 gives the possibility of obtaining a second hollow glass article 110 illustrated in FIG. 6.

The device 100 and the second article 110 are similar to the device 1 and to the first article 10 illustrated in FIGS. 1 to 3, respectively. The similar elements bear the same references and will not be again described. Only the differences will be described in detail hereafter.

The second article 110 has a general butterfly shape (FIG. 6), i.e. the body 12 and the shoulders 18 form two lobes 12A, 12B flaring from the axis D on either side of the axis D.

The shoulders 18 include two portions 35A, 35B which extend on either side of the axis D. The shoulders 18 have a general shape flaring on the side of the ring 14.

The portions 35A, 35B have a general planar shape, and advantageously define at the surface raised and recessed patterns 36A, 36B, for example in the form of ripples or waves.

Each of the portions 35A, 35B for example has a surface of less than 1 cm$^2$, for example at least 2 cm$^2$ as a projection on a given plane, for example the plane P'.

The portions 35A, 35B respectively extend in angular sectors $\beta_A$, $\beta_B$ relatively to the axis D.

The portions 35A, 35B form acute angles $\beta_A$, $\beta_B$ with the axis D.

The acute angles $\beta_A$, $\beta_B$ open on the side opposite to the body 12 along the axis D, i.e. towards the top of FIG. 3 in the illustrated example.

In a similar way to the device 1, the device 100 (FIGS. 4 and 5) comprises a mold 50 in two portions 54, 56 defining a first imprint 58 when the mold is in a closed configuration. The device 100 also comprises a blowing head 52.

The first imprint 58 is adapted so as to form the body 12 of the second article 110. The first imprint 58 includes an aperture 60 for the ring 14, a second aperture 62A and a third aperture 62B.

The second aperture 62A and the third aperture 62B are respectively intended to be located facing the portions 35A, 35B of the shoulders of the second article 110.

The blowing head 52 comprises a lower portion 70 including a first face 76A and a second face 76B respectively having forms mating the portions 35A, 35B.

The lower portion 70 advantageously bears guiding members 112, 114 able to cooperate with guiding members 116, 118 located on the mold 50.

For example, the guiding members 112, 114 are fingers, advantageously substantially oriented along the axis D.

For example, the guiding members 116, 118 are housings respectively defined by the portions 54, 56 of the mold 50, and adapted for receiving the guiding members 112, 114 when the blowing head 52 is moved from the rest position to the blowing position.

The faces 76A, 76B respectively form a second imprint 78A and a third imprint 78B adapted so as to form the portions 35A, 35B, advantageously with their patterns 36A, 36B.

The faces 76A, 76B are for example located on either side of the axis D in the blowing position. The faces 76A, 76B respectively extend in the same angular sectors $\alpha_A$, $\alpha_B$ relatively to the axis D. The portions 54, 56 of the mold 50 are partly located in each of the angular sectors $\alpha_A$, $\alpha_B$.

The operation of the device 100 is similar to that of the device 1 and will not be described in detail.

When the blowing head 52 is lowered by the arm 53 from the rest position to the blowing position, the orifice 72 will be placed facing the first aperture 60 of the first imprint 58. The faces 76A and 76B, which form the second imprint 78A and the third imprint 78B, will close the second aperture 62A and the third aperture 62B. The first imprint 58, the second imprint 78A and the third imprint 78B complement each other in order to form a complete imprint able to form the body 12 and the shoulders 18.

During the blowing of the second article 110, the first imprint 58 gives its external shape (visible in FIG. 6) to the body 12. The second imprint 78A and the third imprint 78B give their external shapes to the portions 35A, 35B.

Upon removal from the mold, the body 12 is drafted relatively to the movement of the portions 54, 56 of the mold 50.

On the other hand, the patterns 36A, 36B are undercut relatively to the movement of the portions 54, 56 upon removal from the mold. The patterns 36A, 36B are drafted relatively to the movement of the faces 76A, 76B upon removal from the mold. It would not be possible to remove the second article 110 from the mold if the faces 76A or 76B were secured to either one of the portions 54, 56 of the mold 50.

By means of the features described above, the device 100 gives the possibility of obtaining a first article 110 including the shoulders 18 including the tilted portions 35A, 35B with the raised and recessed patterns 36A, 36B. The article 110 would not have been able to make in a finishing mold of the state of the art. The device 100 therefore gives the possibility of obtaining a greater variety of shapes for the shoulders 18 of the article 110.

In the invention, the blowing head has a dual function for blowing and shaping the hollow glass article.

What is claimed is:

1. A method for forming a hollow glass article from a parison, the article including a ring extending around an axis, a body and at least one shoulder extending between the ring and the body, the method comprising the steps of:

receiving a parison of the article in a mold including a plurality of movable portions between a closed configuration, in which the portions define a first imprint forming the body of the article, and an open configuration in which the portions are moved away from each other for removing the article from the mold; and injecting at least one gas jet into the inside of the parison by a movable blowing head between a blowing position in which the blowing head is applied against the mold, and a rest position in which the blowing head is at a distance from the mold, the blowing head being in the blowing position during the injection, the blowing head including at least one face defining a second imprint forming at least one portion of the at least one shoulder in the blowing position while the at least one gas jet enters and inflates the parison, the parison assuming the shape of the first imprint and of the second imprint.

* * * * *